United States Patent [19]

Pellico

[11] 3,837,865

[45] Sept. 24, 1974

[54] SETTABLE DENTAL COMPOSITIONS
[75] Inventor: Michael A. Pellico, Los Angeles, Calif.
[73] Assignee: Denton Industries, Inc., Los Angeles, Calif.
[22] Filed: Dec. 8, 1972
[21] Appl. No.: 313,449

[52] U.S. Cl.................. 106/35, 32/15, 106/243, 260/414
[51] Int. Cl............................................. C09k 3/00
[58] Field of Search ................. 106/35, 243; 32/15; 260/414

[56] References Cited
UNITED STATES PATENTS
3,028,247  4/1962  Molnar ........................ 106/38.6 X
3,429,817  2/1969  Furey et al..................... 260/407 X OTHER PUBLICATIONS
Industrial and Engineering Chemistry, "Salts of Residual Dimerized Fat Acids," February 1944, pp. 148–152.

Primary Examiner—Morris Liebman
Assistant Examiner—E. Suzanne Parr
Attorney, Agent, or Firm—Donald Diamond

[57] ABSTRACT

A two-component system is provided wherein the components are adapted to interact to form an oral, settable dental composition. The first component includes a high molecular weight, liquid polycarboxylic acid as, for example, $C_{36}$ dimer acid, $C_{54}$ trimer acid and mixtures thereof and, advantageously, is formulated to also include rosin and a reaction rate activator such as acetic acid. The second component contains a metallic base such as zinc oxide or a mixture of zinc oxide and magnesium oxide in a suitable fluid carrier. The components interact to form a solid, cementitious, coherent mass which is substantially devoid of odor and taste during oral application.

10 Claims, No Drawings

SETTABLE DENTAL COMPOSITIONS

BACKGROUND OF THE INVENTION

This invention relates to oral, settable dental compositions and, more particularly, to the use of high molecular weight polycarboxylic acids in the preparation of such compositions. Typically, settable dental compositions are used for taking dental impressions and, in addition, are used as pulp capping materials and as temporary cements. A settable composition is one which, after being formed, sets into a solid, cementitious, coherent mass.

Heretofore, settable dental compositions were prepared by, for example, interacting zinc oxide and eugenol in the presence of special purpose ingredients such as resin and zinc acetate. Modified eugenol formulations for use as settable dental materials are described in U.S. Pat. No. 2,516,438 (Wheeler, 1950) and U.S. Pat. No. 2,936,242 (Brauer, 1960).

Eugenol-based dental compositions have a number of undesirable characteristics such as causing allergic reactions in some people, damaging certain dental plastics, irritating tissue and denaturing protein. In view of these undesirable features, efforts have been made to develop non-eugenol, settable dental compositions.

In U.S. Pat. No. 3,028,247 (Molnar, 1962), it is disclosed that non-eugenol dental materials can be prepared by interacting a hydroxide or oxide of polyvalent metals such as magnesium, zinc, calcium, copper, barium, strontium, cadmium, iron, cobalt, lead, mercury or nickel with an organic monocarboxylic acid having at least 6 carbon atoms and melting below 65° C. as, for example, caproic acid.

While the compositions disclosed in U.S. Pat. No. 3,028,247 constitute an advance in the art, they are odorous and have a soap-like taste which features tend to cause poor patient acceptance.

OBJECTS

An object of this invention is to provide an improved non-eugenol dental composition which is settable into a solid, cementitious, coherent material.

Another object of this invention is to provide an improved non-eugenol dental composition which is substantially devoid of odor and taste and which has enhanced patient acceptance.

A further object of this invention is to provide an improved non-eugenol dental composition which utilizes high molecular weight polycarboxylic acid in the preparation thereof.

SUMMARY

In accordance with this invention, there is provided a two-component system wherein the components are adapted to interact to form an oral, settable dental composition comprising: component A containing a polycarboxylic acid selected from the group consisting of $C_{36}$ dimer acid, $C_{54}$ trimer acid and mixtures thereof, and component B containing a metallic base selected from the group consisting of oxides and hydroxides of zinc, magnesium, calcium, copper and mixtures thereof in an amount from about 0.1 to about 4.0 parts by weight per 1.0 part by weight of the polycarboxylic acid.

DETAILED DESCRIPTION

The polycarboxylic acids which are utilized in the invention include dimer acid, trimer acid and mixtures thereof. Dimer and trimer acids are viscous liquids which are produced by the polymerization of fatty acids containing 18 carbon atoms. Dimer acid is an aliphatic, dibasic acid containing 36 carbon atoms whose structure is essentially that of a long-chain dicarboxylic acid with 2 alkyl side chains. The approximate molecular weight of dimer acid is 565. Trimer acid is an aliphatic, tribasic acid containing 54 carbon atoms whose structure is essentially that of a long-chain tricarboxylic acid with 3 or more alkyl side chains. The approximate molecular weight of trimer acid is 850.

The metallic base which is interacted with the high molecular weight polycarboxylic acid to provide a settable dental composition is, advantageously, a polyvalent metallic base such as zinc oxide, magnesium oxide, calcium oxide, cupric oxide, zinc hydroxide, magnesium hydroxide, calcium hydroxide, cupric hydroxide and mixtures thereof. A particularly effective polyvalent metallic base is a mixture of zinc oxide and magnesium oxide.

The metallic base is generally employed in an amount from about 0.1 to about 4.0 parts by weight per 1.0 part by weight of polycarboxylic acid and, preferably, in an amount from about 0.25 to about 3.0 parts by weight per 1.0 part of polycarboxylic acid.

A reaction rate activator is advantageously included in the polycarboxylic acid component of the two-component system in order to increase the rate of reaction between the high molecular weight polycarboxylic acid and the metallic base and thereby reduce oral set time. The activator is generally employed in an amount from about 0.25 percent by weight to about 10 percent by weight and, preferably, in an amount from about 0.5 to 5.0 percent by weight based on the weight of the polycarboxylic acid. Reaction rate activators which may be used in practicing the invention include aliphatic organic acids having from 2 to about 10 carbon atoms as well as the calcium, magnesium and zinc salts of the same and mixtures thereof. Examples of activators within this category include acetic acid, proprionic acid, caproic acid and zinc acetate.

Rosin, preferably, partially polymerized rosin (modified rosin), is advantageously included in the polycarboxylic acid component as a reaction rate controller and to improve adhesiveness, impart toughness and reduce brittleness of the interacted product. Rosin is generally added to the polycarboxylic acid in an amount from about 0.3 to about 1.3 parts by weight per 1.0 part by weight of the polycarboxylic acid.

The metallic base component, which is blended with a suitable carrier such as peanut oil, castor oil or mineral oil to impart flowability thereto, and the flowable polycarboxylic acid component are packaged in extrusion tubes for facilitating the dispensing of substantially equal amounts of ingredients for mixing and subsequent oral application.

The compositions prepared by interacting the inorganic compounds described herein with dimer and/or trimer acids in the presence of a reaction rate activator and rosin are particularly well suited for use as dental impression material.

A pulp capping preparation is obtained by formulating the polycarboxylic component containing activator and rosin with about 1 to 5 percent by weight of rosin oil and about 0.5 to 5 percent by weight of ethyl cellulose based on the weight of the polycarboxylic acid and interacting this formulated component with the metallic base component.

A temporary cement is obtained by formulating the polycarboxylic acid component containing activator and rosin with a filler such as polymethylmethacrylate powder and interacting this formulated component with the metallic base component.

By adding lanolin, rosin oil and paraffin wax to polycarboxylic acid containing activator and rosin and interacting the same with the metallic base component, there is obtained a composition which is suitable for use as a periodontal pack.

EXAMPLES

The following examples further illustrate the invention. Modified rosin used in the examples is available under the trademark POLY-PALE from Hercules, Inc. of Wilmington, Delaware. This rosin is identified in The Condensed Chemical Dictionary, 7th ed., p. 764, as pale, hard thermoplastic resins, containing 40 percent dimeric resin acids and having an acid number of 145, a USDA color designation of WG, and a softening point of 102°C. Acetic acid in the examples refers to glacial acetic acid. Dimer acid used in the examples is available from Emery Industries, Inc. under the trademark EMPOL 1018 and trimer acid used in the examples is available from Emery Industries, Inc. under the trademark EMPOL 1040. These acids, which are fully described in Emery Industries, Inc. 1971 copyrighted technical brochure entitled EMPOL Dimer and Trimer Acids, have the following properties and characteristics:

|  | EMPOL 1018 Dimer Acid | EMPOL 1040 Trimer Acid |
|---|---|---|
| Acid value | 188–196 | 183–191 |
| Sap. value | 192–198 | 192–200 |
| Color Gardner 1963 | 8 | — |
| Neutral equiv. | 287–299 | — |
| Dimer Acid, % ($C_{36}$ dibasic acid) (M. W. approx. 565) | 83 | 20 |
| Trimer acid, % ($C_{54}$ tribasic acid) (M. W. approx. 845) | 17 | 80 |
| Monobasic acids, % ($C_{18}$ fatty acids) M. W. approx. 282) | trace | 0 |
| Refractive index at 25°C. | 1.470 | 1.495 |
| Specific gravity at 25/20°C. | 0.941 | 0.975 |
| Pounds per gallon at 25°C. | 7.8 | 8.1 |
| Pour point, °F. | 35 | 55 |
| Flash point, °F. | 565 | 595 |
| Fire point, °F. | 600 | 680 |
| Viscosity at 25°C. Centistokes | 7500 | 60,000 |
| Unsaponifiable, % | 0.2 | 0.3 |
| Surface tension, (dynes/cm at 25°C.) | 33.4 | — |

EXAMPLE I

| Component A | Wt. lbs. | Component B | Wt. lbs. |
|---|---|---|---|
| Dimer acid | 30.0 | Zinc oxide | 60.0 |
| Modified rosin | 20.0 | Magnesium oxide | 30.0 |
| Acetic acid | 0.5 | Castor oil | 10.0 |

Component A was prepared by mixing modified rosin with dimer acid and heating the mixture to 200° F. or until the modified rosin is melted and dissolved in the dimer acid at which point acetic acid is added to the mixture.

Component B was prepared by mixing zinc oxide and magnesium oxide with castor oil in a suitable mixer at room temperature until a smooth mixture was obtained.

Extrusion tubes were filled with Component A and with Component B. Equal amounts of Component A and Component B were dispensed onto a mixing board at room temperature and hand mixed. The mixture formed a solid, cementitious, coherent mass in 4 minutes, hereinafter referred to as set time.

Example II

| Component A | Wt. lbs. | Component B | Wt. lbs. |
|---|---|---|---|
| Dimer acid | 30.0 | Zinc oxide | 90.0 |
| Modified rosin | 20.0 | Mineral oil | 10.0 |
| Acetic acid | 0.5 | | |

Example III

| Component A | Wt. lbs. | Component B | Wt. lbs. |
|---|---|---|---|
| Dimer acid | 100.0 | Zinc oxide | 90.0 |
| Acetic acid | 1.5 | Castor oil | 10.0 |
| Ethyl cellulose | 1.0 | | |

Example IV

| Component A | Weight | Component B | Wt. lbs. |
|---|---|---|---|
| Dimer acid | 30 lbs. | Zinc oxide | 60.0 |
| Modified rosin | 20 lbs. | Magnesium oxide | 30.0 |
| Acetic acid | 100 grams | Castor oil | 10.0 |
| Zinc acetate | 100 grams | | |

Example V

| Component A | Wt. lbs. | Component B | Wt. lbs. |
|---|---|---|---|
| Trimer acid | 30.0 | Zinc oxide | 60.0 |
| Modified rosin | 20.0 | Magnesium oxide | 30.0 |
| Acetic acid | 0.5 | Peanut oil | 10.0 |

Set times for the compositions of Examples II, III, IV and V which are prepared in accordance with the procedure set forth in Example I are as follows: Example II, 5 minutes; Example III, 4 minutes, Example IV, 1.5 minutes and Example V, 6 minutes.

EXAMPLE VI

This example illustrates the wide proportions in which the metallic base can be interacted with the polycarboxylic acid to provide settable dental compositions. The compositions were prepared by direct hand mixing of the ingredients at room temperature and set times were noted.

| Ingredients | Wt. grams | Set Time Minutes |
|---|---|---|
| Example VI(a) | | 130 |
| Zinc oxide | 36.0 | |
| Dimer acid | 9.0 | |
| Example VI(b) | | 45 |

-Continued

| Ingredients | Wt. grams | Set Time Minutes |
|---|---|---|
| Zinc oxide | 36.0 | |
| Dimer acid | 9.0 | |
| Acetic acid | 0.1 | |
| Example VI(c) | | 15 |
| Zinc oxide | 36.0 | |
| Dimer acid | 9.0 | |
| Acetic acid | 0.5 | |
| Example VI(d) | | 2 |
| Zinc oxide | 36.0 | |
| Dimer acid | 9.0 | |
| Acetic acid | 1.0 | |
| Example VI(e) | | 60 |
| Zinc oxide | 1.0 | |
| Dimer acid | 10.0 | |
| Example VI(f) | | 30 |
| Zinc oxide | 1.0 | |
| Dimer acid | 10.0 | |
| acetic acid | 0.5 | |
| Example VI(g) | | 2.5 |
| Zinc oxide | 1.0 | |
| Dimer acid | 10.0 | |
| Acetic acid | 1.0 | |
| Example VI(h) | | 120 |
| Zinc oxide | 1.0 | |
| Trimer acid | 9.0 | |
| Example VI(i) | | 210 |
| Zinc oxide | 36.0 | |
| Trimer acid | 9.0 | |

The compositions of the foregoing examples are substantially devoid of odor and taste and are particularly well suited for use as settable materials in oral dental applications.

I claim:

1. A method for preparing an oral, settable dental composition which comprises interacting:
   component A containing (i) a polycarboxylic acid selected from the group consisting of $C_{36}$ dimer acid, $C_{54}$ trimer acid and mixtures thereof, and (ii) a reaction rate activator selected from the group consisting of aliphatic organic acids having from about 2 to about 10 carbon atoms, calcium, magnesium and zinc salts of said acids and mixtures thereof in an amount from about 0.25 percent by weight to about 10 percent by weight based on the weight of the polycarboxylic acid, and
   component B containing a metallic base selected from the group consisting of oxides and hydroxides of zinc, magnesium, calcium, copper and mixtures thereof, said metallic base being present in an amount from about 0.1 to about 4.0 parts by weight per 1.0 part by weight of polycarboxylic acid.

2. A method according to claim 1 wherein the metallic base is present in an amount from about 0.25 to 3.0 parts by weight per part 1.0 part by weight of polycarboxylic acid.

3. A method according to claim 1 wherein the reaction rate activator is present in an amount from about 0.5 percent by weight to about 5.0 percent by weight based on the weight of the polycarboxylic acid.

4. A method according to claim 1 wherein component A includes rosin in an amount from about 0.3 to about 1.3 parts by weight per 1.0 part by weight of polycarboxylic acid.

5. A method according to claim 1 wherein the polycarboxylic acid of component A is $C_{36}$ dimer acid.

6. A method according to claim 1 wherein the polycarboxylic acid of component A is $C_{54}$ trimer acid.

7. A method according to claim 1 wherein the metallic base of component b is zinc oxide.

8. A method according to claim 1 wherein the metallic base of component B is a mixture of zinc oxide and magnesium oxide.

9. A method according to claim 4 wherein the polycarboxylic acid of component A is $C_{36}$ dimer acid, the reaction rate activator of component A is acetic acid and the metallic base of component B is a mixture of zinc oxide and magnesium oxide.

10. A solid, coherent, cementitious, dental composition prepared by interacting:
    component A containing (i) a polycarboxylic acid selected from the group consisting of $C_{36}$ dimer acid, $C_{54}$ trimer acid and mixtures thereof, and (ii) a reaction rate activator selected from the group consisting of aliphatic organic acids having from about 2 to about 10 carbon atoms, calcium, magnesium and zinc salts of said acids and mixtures thereof in an amount from about 0.25 percent by weight to about 10% by weight based on the weight of the polycarboxylic acid, and
    component B containing a metallic base selected from the group consisting of oxides and hydroxides of zinc, magnesium, calcium, copper and mixtures thereof, said metallic base being present in an amount from about 0.1 to about 4.0 parts by weight per 1.0 part by weight of polycarboxylic acid.

* * * * *